United States Patent
Lin et al.

(10) Patent No.: US 11,947,886 B2
(45) Date of Patent: Apr. 2, 2024

(54) DEVELOPMENT SYSTEM AND METHOD OF OFFLINE SOFTWARE-IN-THE-LOOP SIMULATION

(71) Applicant: DELTA ELECTRONICS, INC., Taoyuan (TW)

(72) Inventors: Yu-Jen Lin, Taoyuan (TW); Chang-Chung Lin, Taoyuan (TW); Chia-Wei Chu, Taoyuan (TW); Terng-Wei Tsai, Taoyuan (TW); Feng-Hsuan Tung, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 116 days.

(21) Appl. No.: 17/852,149

(22) Filed: Jun. 28, 2022

(65) Prior Publication Data
US 2023/0009172 A1 Jan. 12, 2023

Related U.S. Application Data

(60) Provisional application No. 63/220,199, filed on Jul. 9, 2021.

(30) Foreign Application Priority Data

Apr. 19, 2022 (CN) .......................... 202210412024.2

(51) Int. Cl.
*G06F 8/30* (2018.01)
*G06F 8/41* (2018.01)
(Continued)

(52) U.S. Cl.
CPC ............ *G06F 30/3308* (2020.01); *G06F 8/41* (2013.01); *G06F 8/70* (2013.01); *G06F 11/3688* (2013.01); *G06F 11/3696* (2013.01)

(58) Field of Classification Search
CPC ............ G06F 11/3696; G06F 11/3688; G06F 30/3308; G06F 8/41; G06F 8/70
See application file for complete search history.

(56) References Cited

U.S. PATENT DOCUMENTS 9,952,837 B1 * 4/2018 Maclay .................... G06F 8/41
10,430,181 B1 10/2019 Su
(Continued)

FOREIGN PATENT DOCUMENTS

| TW | 201729096 A | 8/2017 |
|----|-------------|--------|
| TW | 202009696 A | 3/2020 |

OTHER PUBLICATIONS

Su, Mei-Lin, TW 202009696 (translation ) Mar. 1, 2020, 15 pgs < TW_202009696.pdf>.*
(Continued)

*Primary Examiner* — Tuan A Vu
(74) *Attorney, Agent, or Firm* — Muncy, Geissler, Olds & Lowe, P.C.

(57) ABSTRACT

A development system and a method of an offline software-in-the-loop simulation are disclosed. A common firmware architecture generates a chip control program. The common firmware architecture has an application layer and a hardware abstraction layer. The application layer has a configuration header file and a product program. A processing program required by a peripheral module is added to the hardware abstraction layer during compiling. The chip control program is provided to a controller chip or a circuit simulation software to be executed to control the product-related circuit through controlling the peripheral module.

20 Claims, 17 Drawing Sheets

(51) Int. Cl.
*G06F 8/70* (2018.01)
*G06F 11/36* (2006.01)
*G06F 30/3308* (2020.01)

(56) References Cited

U.S. PATENT DOCUMENTS

2010/0017185 A1* 1/2010 Bade .................. G06F 30/3308
 703/13
2017/0184667 A1 6/2017 Bhatt et al.
2019/0303759 A1 10/2019 Farabet et al.

OTHER PUBLICATIONS

JP H04175974, (translation), Jun. 23, 1992, 9 pgs < JP_H04175974.pdf>.*
Office Action dated Feb. 13, 2023 of the corresponding Taiwan patent application No. 111114776.
Matthias et al., "Real-Time Simulation and Hardware-in-the-Loop Testbed for Distribution Synchrophasor Applications," Energies, Apr. 10, 2018./\&rn/\https://www.mdpi.com/1996-1073/11/4/876/\&rn/\.
Office Action in corresponding JP Application No. 2021189353 dated Jan. 10, 2023, is attached, 2 pages and its English translation 1 page.

\* cited by examiner

```
cfa_hal_config.h
1   #define PRODUCT_MODE
2   //#define VIRTUAL_MODE
3
4   #if defined PRODUCT_MODE
5     #define CONFIG_VENDOR_TI
6     #define CONFIG_COMPILER_C2000
7     #define CONFIG_DEVICE_F28035
8   #elif defined VIRTUAL_MODE
9     #define CONFIG_VENDOR_SIMULINK
10    #define CONFIG_COMPILER_MINGW_W64
11  #else
12    #error "unsupported option"
13  #endif
```

Mode selection → (line 1-2)
Device selection → (lines 5-7, 9-10)

DEVELOPMENT SYSTEM AND METHOD OF OFFLINE SOFTWARE-IN-THE-LOOP SIMULATION

CROSS-REFERENCE TO RELATED APPLICATION

This patent application claims the benefit of U.S. Provisional Patent Application No. 63/220,199, filed Jul. 9, 2021, which is incorporated by reference herein.

BACKGROUND

Technical Field

The disclosure relates to a software-in-the-loop simulation, particularly relates to a development system and a method of offline software-in-the-loop simulation.

Description of Related Art

The general circuit equipment includes the controller chip and product related circuit.

The controller chip is configured to control the product related circuit through executing firmware, thereby realizing automatic control for circuit.

In the development procedure of the firmware, the method of the software-in-the-loop simulation is mostly being adopted to generate the firmware compatible with specific controller chip.

The method of the software-in-the-loop simulation is divided to the method of the real-time software-in-the-loop simulation and the method of the offline software-in-the-loop simulation.

The general method of real-time software-in-the-loop simulation is directly connecting the development system with the circuit equipment through the high-speed communication interface and/or specific hardware to directly measure the signal of the peripheral module. The hardware cost of the method of real-time software-in-the-loop simulation is higher with respect to the high-speed communication interface and/or specific hardware.

Please refer to FIG. 1, which is a schematic diagram of the related-art method of the offline software-in-the-loop simulation.

In the related-art method of the offline software-in-the-loop simulation, the developer firstly needs to realize the method of the model-in-the-loop simulation to generate the controller model.

The controller model is used to automatically generate the controller code executable for the control target (such as the controller chip of specific manufacturer/model).

The developer may provide the generated controller code for the control target to execute, and verify whether the program logic is correct by observing the operating result, thereby realizing the method of the offline software-in-the-loop simulation.

In the related-art method of the offline software-in-the-loop simulation, the circuit simulation software used by the developer needs to support the type of presently used controller chip to make the controller code generated by the controller model be correctly compatible with the type of controller chip for performing correct simulation.

Further, with respect to the controller chips of different manufacturer/model, the circuit simulation software has to provide different controller models to execute the automatic code generating.

The aforementioned condition makes the circuit simulation software only support limited manufacturer/model of the controller chip, and when the manufacturer/model of the controller chip is unsupportive, the circuit simulation software is not able to automatically generate the controller code compatible to the controller chip.

In view of this, the inventors have devoted themselves to the aforementioned related art, researched intensively try to solve the aforementioned problems.

SUMMARY OF THE DISCLOSURE

The object of the disclosure is to provide a development system and a method of offline software-in-the-loop simulation, which may make the product program be compatible to specific controller chip or circuit simulation software through the hardware abstraction layer of the common firmware architecture without changing the product program.

In some embodiments, a development system of an offline software-in-the-loop simulation is disclosed. The development system includes a database and a common firmware architecture. The common firmware architecture includes an application layer and a hardware abstraction layer (HAL). The database includes at least one chip peripheral library. The chip peripheral library includes at least one processing program. The common firmware architecture is configured to generate a chip control program after being compiled. The application layer includes a product program and a configuration header file. The product program is configured to record a code of controlling a product related circuit. The configuration header file is configured to connect the processing program required by a peripheral module. The HAL includes the processing program. The application layer is configured to add the processing program from the database to the HAL correspondingly during compilation based on the peripheral module being controlled specifically by a physical chip or a circuit simulation software. The chip control program is configured to be executed in the physical chip or the circuit simulation software, and control the product related circuit through controlling the peripheral module.

In some embodiments, a method of an offline software-in-the-loop simulation is disclosed. The method includes: a) obtaining a product program and a configuration header file, wherein the product program is configured to record a code of controlling a product related circuit, the configuration header file is configured to connect a processing program required by a peripheral module, and the processing program is configured to control the peripheral module in a physical chip or a circuit simulation software; b) executing a compiler to compile the product program and the configuration header file to generate a chip control program; and c) executing the chip control program in the physical chip or the circuit simulation software to control the product related circuit through controlling the peripheral module; wherein the b) includes: b1) searching the processing program from a database based on the configuration header file, and adding the processing program to a hardware abstraction layer (HAL); b2) compiling an application layer and the HAL to generate the chip control program, wherein the application layer includes the product program and the configuration header file; and b3) providing the chip control program to the physical chip or the circuit simulation software.

The disclosure may rapidly divert the product program to different types of controller chip or circuit simulation software to effectively decrease the developing time schedule of firmware.

BRIEF DESCRIPTION OF THE DRAWINGS

FIG. 13 is a partially schematic diagram of the configuration header file of the disclosure in accordance with some embodiments.

FIG. 14 is a schematic diagram of the processing program of the controller chip of the disclosure in accordance with some embodiments.

FIG. 15 is a partially schematic diagram of the processing program of the circuit simulation software of the disclosure in accordance with some embodiments.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
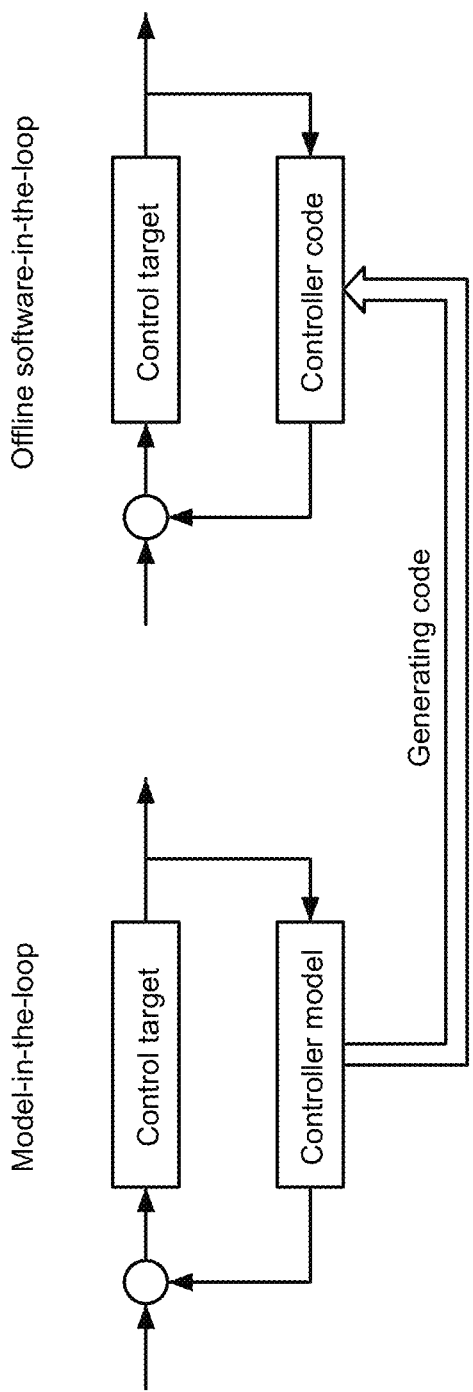
FIG. 1 is a schematic diagram of the related-art method of the offline software-in-the-loop simulation.
Figure 2:
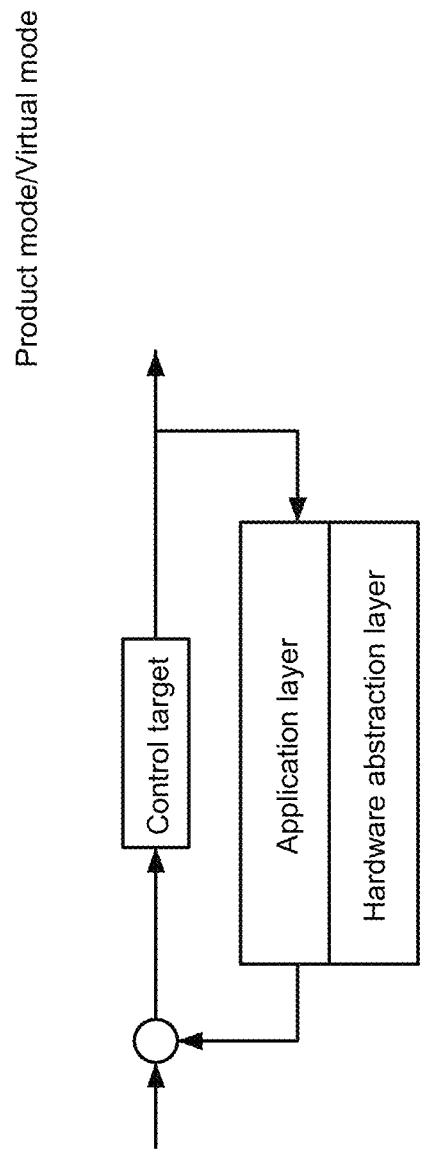
FIG. 2 is a schematic diagram of the method of the offline software-in-the-loop simulation of the disclosure in accordance with some embodiments.
Figure 3A:
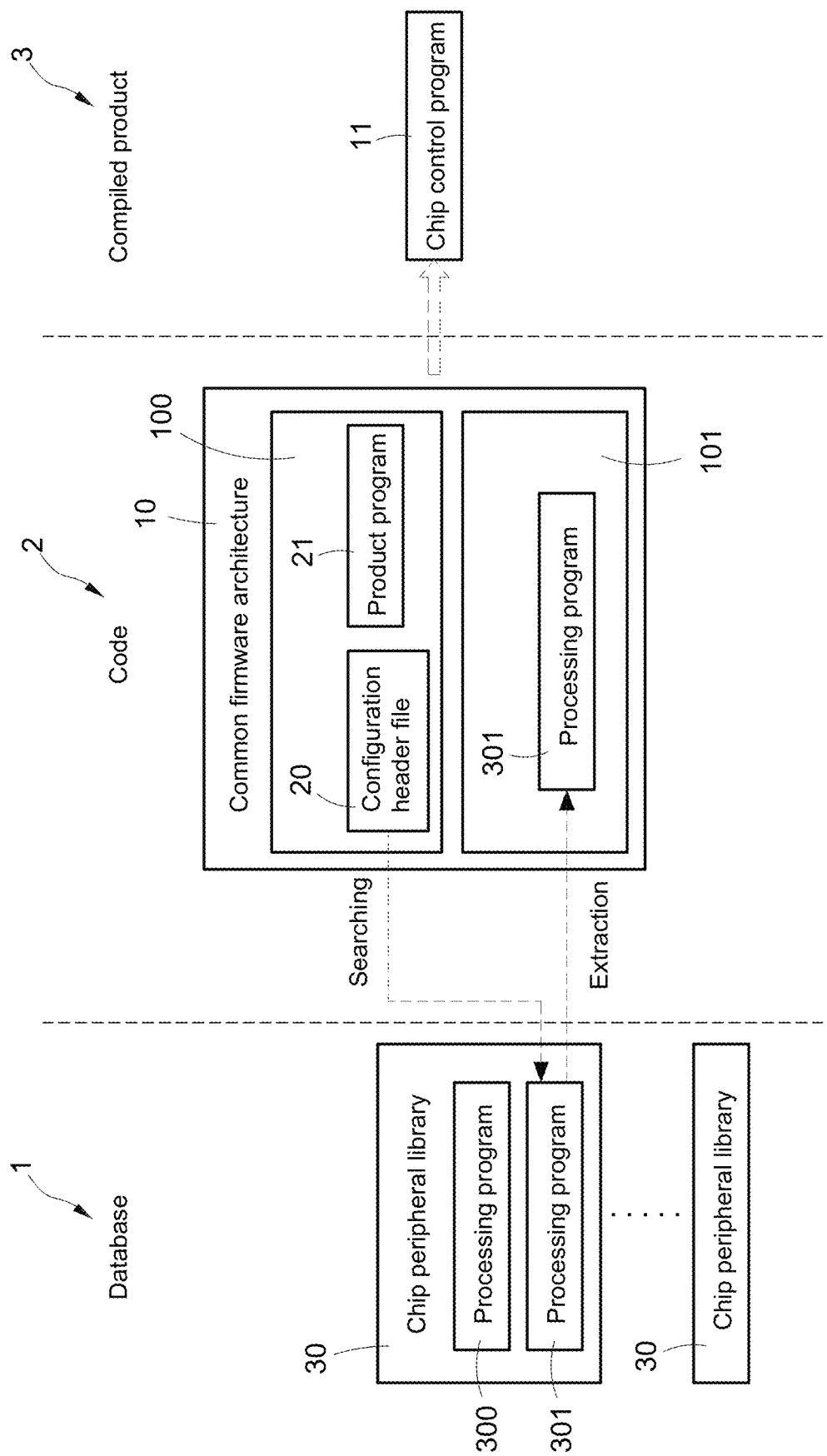
FIG. 3A is a compiling architecture diagram of the development system of the disclosure in accordance with some embodiments.
Figure 3C:
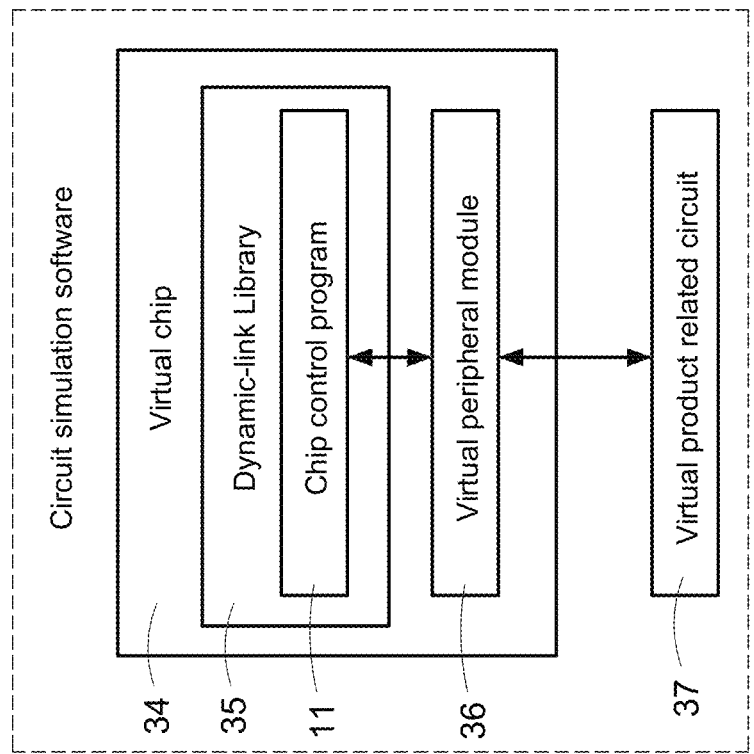
FIG. 3C is an executing architecture diagram of the virtual mode of the development system of the disclosure in accordance with some embodiments.
Figure 3B:
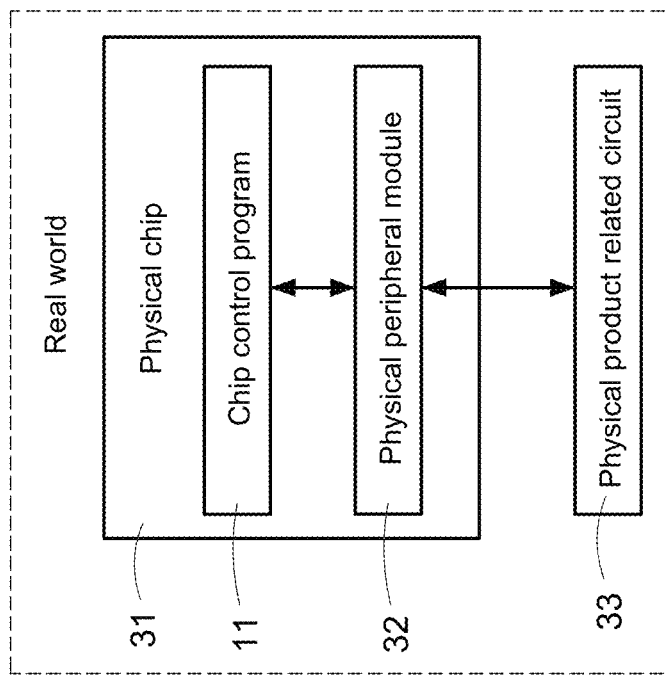
FIG. 3B is an executing architecture diagram of the product mode of the development system of the disclosure in accordance with some embodiments.

Please refer to FIG. 2, FIG. 3A, FIG. 3B and FIG. 3C, FIG. 2 is a schematic diagram of the method of the offline software-in-the-loop simulation of the disclosure in accordance with some embodiments, FIG. 3A is a compiling architecture diagram of the development system of the disclosure in accordance with some embodiments, FIG. 3B is an executing architecture diagram of the product mode of the development system of the disclosure in accordance with some embodiments, and FIG. 3C is an executing architecture diagram of the virtual mode of the development system of the disclosure in accordance with some embodiments.

The disclosure provides a development system and a method of offline software-in-the-loop simulation, which may rapidly divert the product program to designated control target by simple configuration, and generate the firmware (such as the after-mentioned chip control program) compatible to the designated control target, thereby providing desirable porting capability for the product program.

The control target may be, for example, different types/models of controller chips or circuit simulation software used for simulating different controller chip.

In the disclosure, the development system may be, for example, the common computer system such as personal computer, laptop, tablet computer, etc., and include storage (such as register, cache memory, flash memory, hard disk drive, solid state drive, RAM, ROM, EEPROM, etc.), input device (such as keyboard, mouse, touch pad, etc.), output device (such as display, speaker, etc.), communication interface (such as USB interface, Wi-Fi interface, Bluetooth interface, serial communication interface, etc.), processor (such as CPU, GPU, ALU, etc.) electrically connected with the aforementioned devices, and/or the other computer devices.

The storage is used to store the database 1, the common firmware architecture (CFA) 10, the development software, the circuit simulation software and/or the other programs/software.

The processor is used to execute the program/software stored in the storage to perform data write-in/read-out to the storage, and interact with the developer through the input device and output device.

The development system of the disclosure may include a CFA 10 structured by code 2, and provide a product mode and a virtual mode. Under the product mode (that is, the real world shown in FIG. 3B), the control target may be the physical chip 31. Under the virtual mode (that is, the circuit simulation software shown in FIG. 3C), the control target may be the virtual chip 34 of the circuit simulation software.

The database of the development system may include one or multiple chip peripheral libraries 30. Each chip peripheral library 30 is corresponding to a controller chip such as the physical chip 31 or virtual chip 34.

Further, each chip peripheral library 30 may include one or multiple processing programs (FIG. 3A uses multiple processing programs 300, 301 as an example). The processing programs 300, 301 of each chip peripheral library 30 are used to control multiple peripheral modules of corresponding controller chip, respectively, such as the physical peripheral module 32 of the physical chip 31, or the virtual peripheral module 36 of the virtual chip 34.

The CFA 10 of the development system is the architecture of code 2, and the development system includes a compiler. The CFA 10 generates the chip control program 11 (that is, the compiled product 3 of the CFA 10) after being compiled by the compiler. The chip control program 11 is used to control the peripheral module to execute the function designated by the product program 21.

The CFA 10 may include an application layer 100 and a hardware abstraction layer (HAL) 101.

The application layer 100 includes the product program 21 and configuration header file 20.

The product program 21 is configured to record the code used to control the product related circuit. The configuration header file 20 is used to connect the processing program 301 required by the peripheral module (such as the physical peripheral module 32 of the physical chip 31, or the virtual peripheral module 36 of the virtual chip 34) of the designated controller chip.

Specifically, the developer may write the product program 21 with respect to the control function to be realized. The product program 21 is configured to call the product related sub-program without taking the type of the control target to be executed (such as the physical chip 31 or virtual chip 34) into account.

Afterward, when the control target executing the product program 21 is determined, the developer may modify the configuration header file 20 of the product program 21 to connect the processing program 301 used for controlling the peripheral module through the configuration header file 20.

Further, the developer may select corresponding peripheral module according to the control function used by the product program 21, and set the processing program 301 required by the peripheral module in the configuration header file 20.

The processing program 301 is compatible with the peripheral module (such as the physical peripheral module 32 of the physical chip 31, or the virtual peripheral module 36 of the virtual chip 34) of the designated controller chip, and may be used as the medium of the product program 21 for controlling the peripheral module.

Taking fan speed control function as an example, the product program 21 has to output the fan speed control signal (PWM signal) to the fan device (product related circuit) through the PWM module (peripheral module) of the controller chip.

Taking LED control function as an example, the product program 21 has to output the I/O control signal to the LED device (product related circuit) through the GPIO module (peripheral module) of the controller chip.

In the disclosure, the development system may use the compiler to compile the code 2 of the CFA 10 to acquire the chip control program 11.

Specifically, the compiler is configured to search the chip peripheral library 30 corresponding to the present controller chip from the database 1 based on the configuration header file 20, extract the processing program 301 designated by the configuration header file 20 from multiple processing programs 300, 301 of obtained chip peripheral library 30, and add the processing program 301 to the HAL 101.

Thereafter, the compiler is configured to execute compilation and connection of all codes 2 of the CFA 10 to generate the chip control program 11.

In the disclosure, the generated chip control program 11 is provided to the physical chip 31 (product mode) in real world or the circuit simulation software (virtual mode).

Under the product mode, the developer may connect the development system to the physical chip 31 through the communication interface, and program the chip control program 11 to the physical chip 31 through the development software and communication interface corresponding to the physical chip 31.

When the physical chip 31 executes the chip control program 11, the product program 21 of the chip control program 11 is configured to control the physical peripheral module 32 of the physical chip 31 through the processing program 301. The product program 21 may indirectly control the physical product related circuit 33 connected to the physical peripheral module 32 through controlling the physical peripheral module 32.

In some embodiments, each physical peripheral module 32 has one or multiple exclusive signal pins, and is connected with corresponding physical product related circuit 33 through the pins.

In some embodiments, the physical product related circuit 33 may be, for example, fan device, power device, lighting device, here is not intended to be limiting.

Under the virtual mode, the chip control program 11 is included in the dynamic-link library (DLL) 35, the developer updates the DLL 35 to the circuit simulation software.

Afterward, the virtual chip 34 of the circuit simulation software is configured to execute the DLL 35. When the DLL 35 is executed, the product program 21 of the chip control program 11 controls the virtual peripheral module 36 of the virtual chip 34 through the processing program 301. The product program 21 may indirectly control the virtual product related circuit 37 connected to the virtual peripheral module 36 through controlling the virtual peripheral module 36.

As a result, by observing the execution result (such as the response or feedback signal of the physical product related circuit 33/virtual product related circuit 37, or the signal transmitted by the physical peripheral module 32/virtual peripheral module 36) of the chip control program 11, the developer may verify the circuit control procedure (program logic) defined by the product program 21 and rapidly diagnose whether the product program 21 has defect or error.

The CFA 10 of the disclosure may provide desirable portability.

Specifically, when changing different types of controller chip (including physical chip 31 and virtual chip 34), the disclosure may be configured to execute the offline software-in-the-loop simulation to new controller chip without rewriting the product program 21 by merely expanding the chip peripheral library 30 with respect to new controller chip and modifying the configuration header file 20 to connect the processing program 301 of compatible chip peripheral library 30.

Additionally, the disclosure has better version management capability of design change with the reason of independent from the control model structured by the model-in-the-loop.

Specifically, during the developing procedure of the circuit equipment, in general, the product program 21 needs to be frequently modified and repeatedly tested, and a large amount of versions of product program 21 may be generated.

The related-art method of the offline software-in-the-loop simulation is automatically generating the code through the control model, and the version management is difficult to be accomplished.

The disclosure does not automatically generate the code through the control model, and the product program 21 of each version is in a text format, thereby conveniently managing the versions.

Figures 4A, 4B:
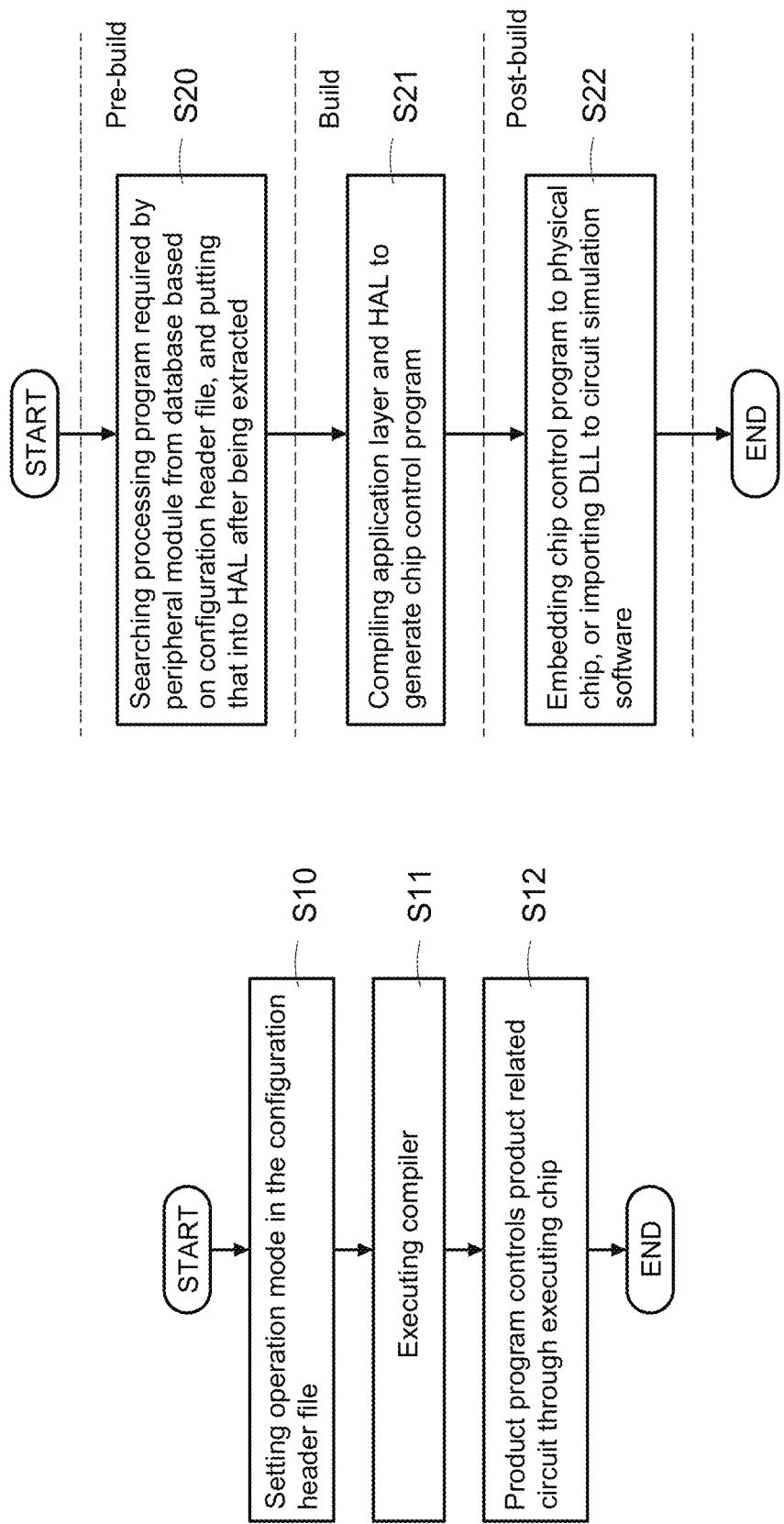
FIG. 4A is a flowchart of the method of the offline software-in-the-loop simulation of the disclosure in accordance with some embodiments.
FIG. 4B is a flowchart of the compilation of the disclosure in accordance with some embodiments.

Please refer to FIG. 3A, FIG. 3B, FIG. 3C, FIG. 4A and FIG. 4B, FIG. 4A is a flowchart of the method of the offline software-in-the-loop simulation of the disclosure in accordance with some embodiments, FIG. 4B is a flowchart of the compilation of the disclosure in accordance with some embodiments.

The method of the offline software-in-the-loop simulation in the embodiments of the disclosure may be realized through the development system in the embodiments of the disclosure.

The method of the offline software-in-the-loop simulation of the embodiment includes the step S10 to the step S12.

In the step S10, the development system is configured to obtain the product program 21 and the configuration header file 20, and set the operating mode based on the configuration header file 20.

In some embodiments, the developer may set the operating mode to be the product mode or virtual mode in the configuration header file 20.

In the step S11, the development system is configured to compile the product program 21 and configuration header file 20 in the CFA 10 through executing the compiler to generate the chip control program 11.

In some embodiments, under the product mode, the compiler may be provided by the development software corresponding to the physical chip 31.

In some embodiments, under the virtual mode, the compiler may be provided by the circuit simulation software.

Please refer to FIG. 4B, in some embodiments, the steps of executing the compiler include the step S20 to the step S22.

In the step S20, on the pre-build (that is, before generating executable file) stage, the development system is configured to search connected processing program 301 from the database 1 based on the configuration header file 20, and add the processing program 301 to the HAL 101.

In the step S21, on the build (that is, during generating executable file) stage, the development system is configured to compile and connect the application layer 100 and HAL 101 of the CFA 10 through the compiler to generate the executable chip control program 11.

In the step S22, on the post-build (that is, after generating executable file) stage, the development system is configured to provide the chip control program 11 to the physical chip 31 or circuit simulation software.

For example, under the product mode, the development system may implant the chip control program 11 to the physical chip 31.

For another example, under the virtual mode, the development system may import the DLL 35 having the chip control program 11 to the virtual chip 34 of the circuit simulation software.

Referring back to FIG. 4A, in the step S12, the physical chip 31 or the virtual chip 34 of the circuit simulation software executes the chip control program 11 to control the product related circuit through controlling the peripheral module.

Figure 5:
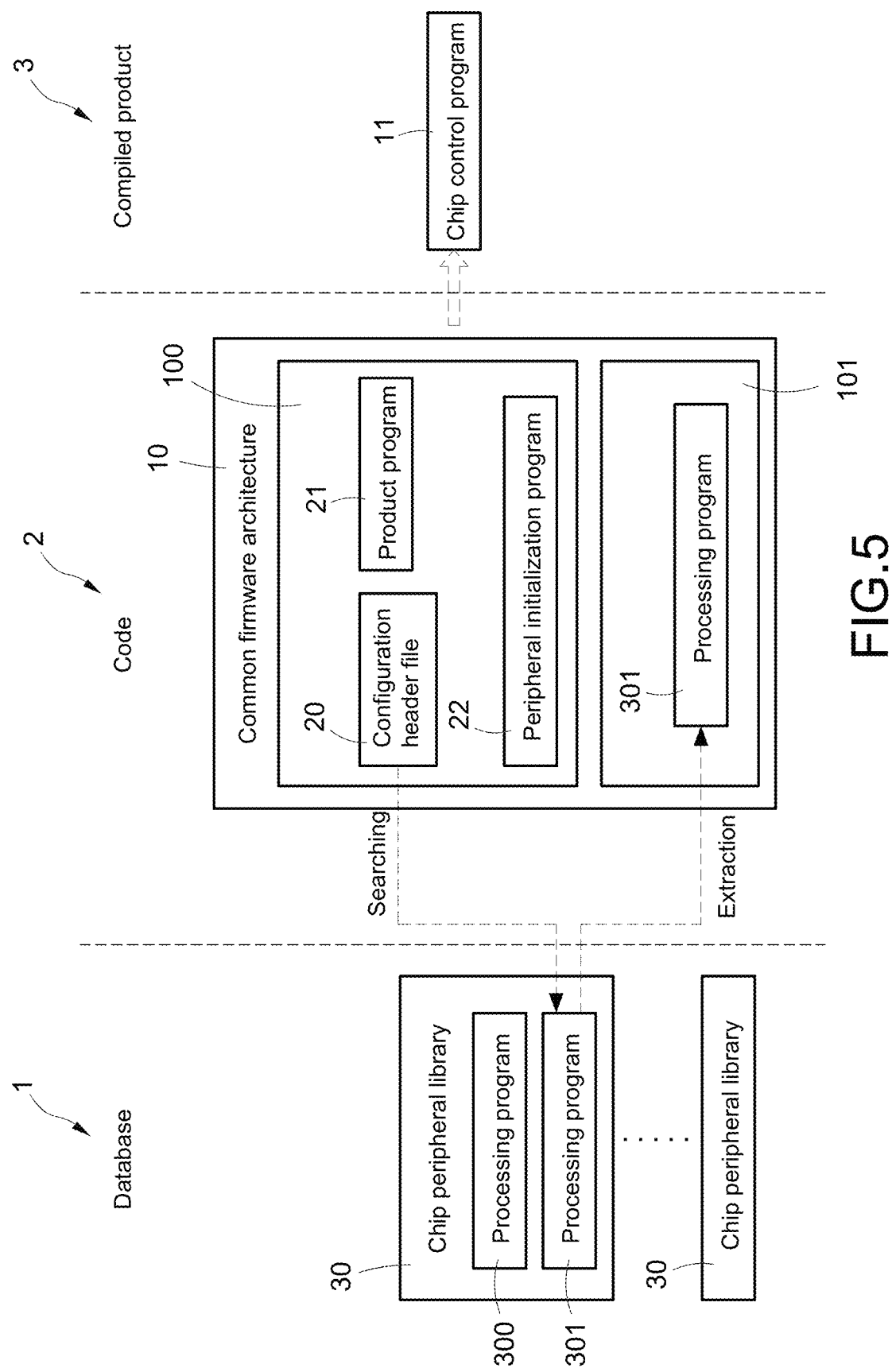
FIG. 5 is a compiling architecture diagram of the product mode of the disclosure in accordance with some embodiments.
Figure 6:
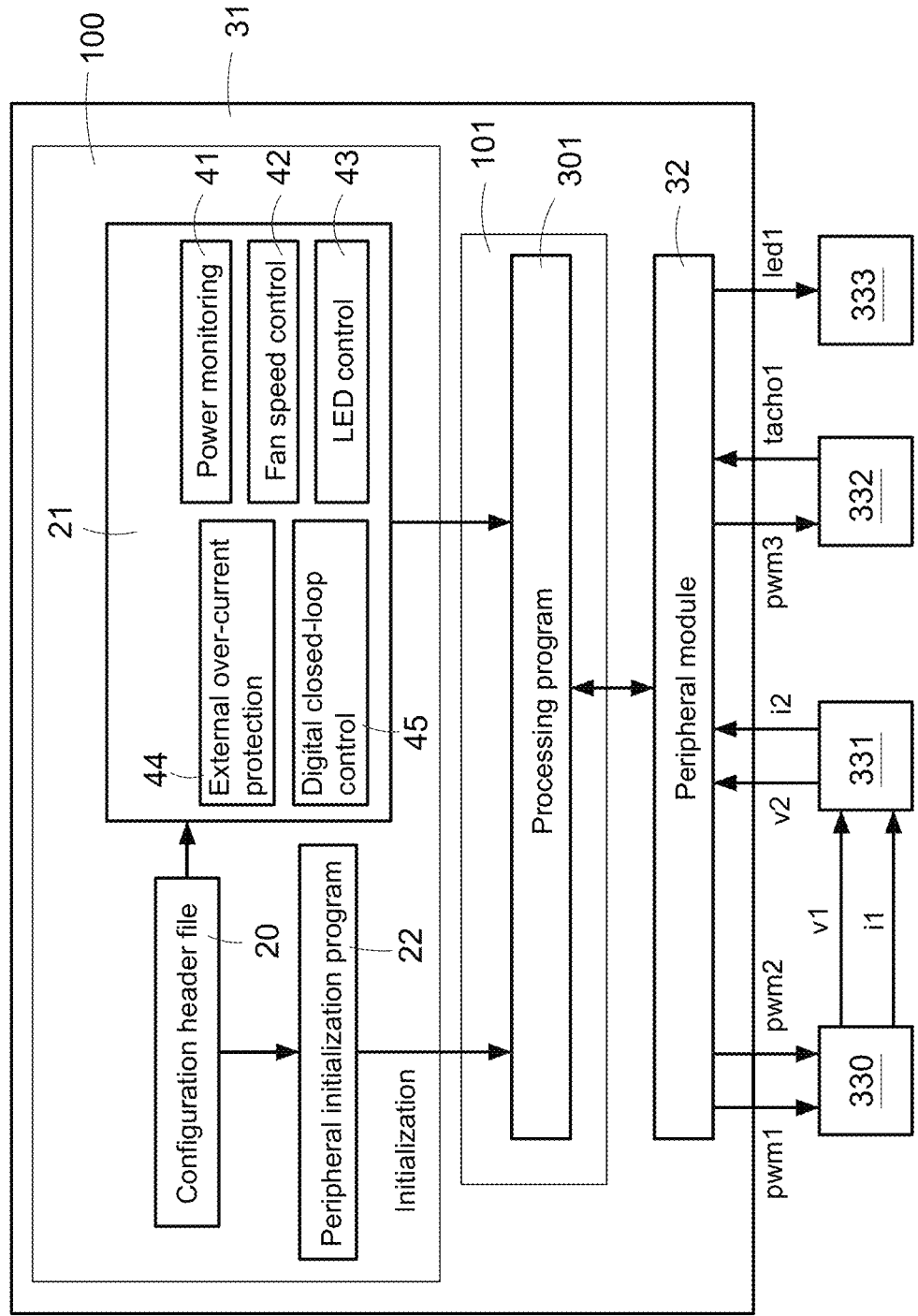
FIG. 6 is an executing architecture diagram of the product mode of the disclosure in accordance with some embodiments.
Figure 7:
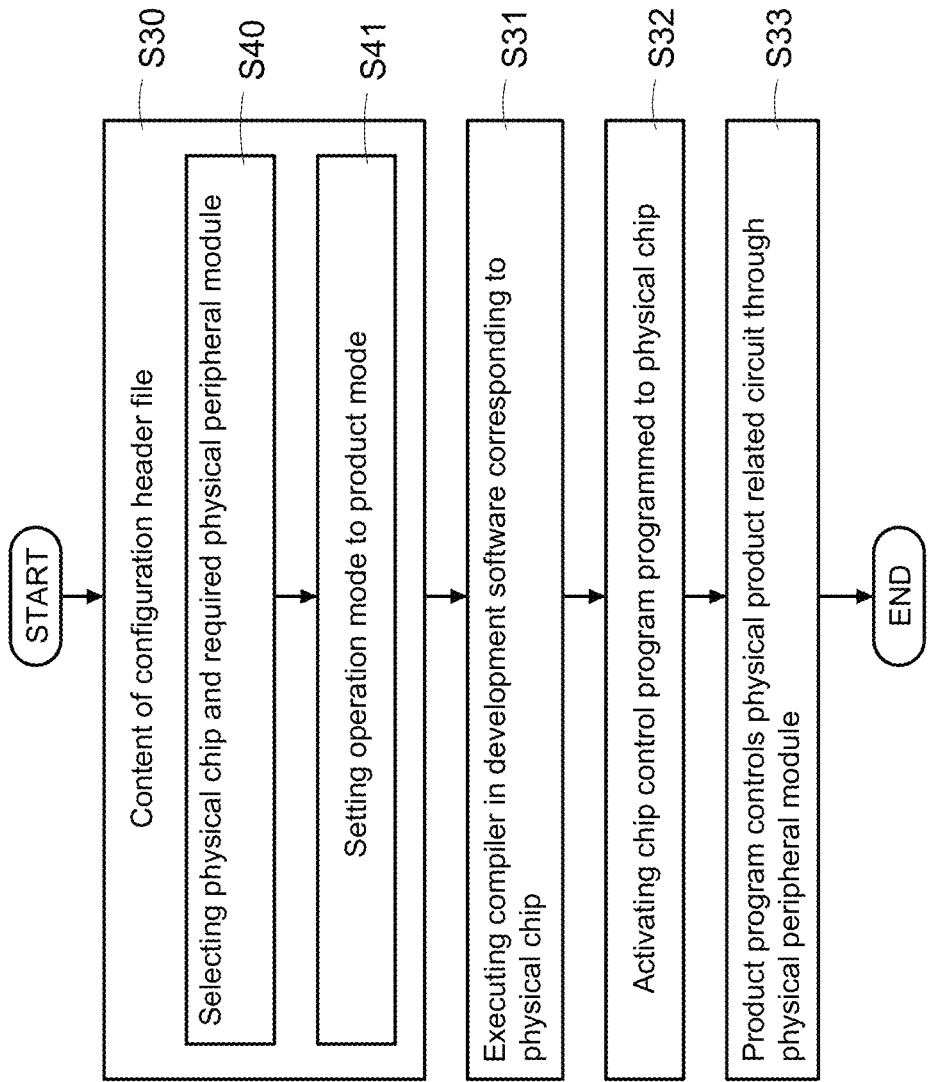
FIG. 7 is a flowchart of the product mode of the disclosure in accordance with some embodiments.

Please refer to FIG. 5, FIG. 6 and FIG. 7, which describe the product mode of the disclosure. FIG. 5 is a compiling architecture diagram of the product mode of the disclosure in accordance with some embodiments. FIG. 6 is an executing architecture diagram of the product mode of the disclosure in accordance with some embodiments. FIG. 7 is a flowchart of the product mode of the disclosure in accordance with some embodiments.

For the development system to execute the product mode, the developer may set the operating mode in the configuration header file 20 to be the product mode, select the physical chip 31, and select the physical peripheral module 32 required by the product program 21.

In some embodiments, the application layer 100 may include one or multiple peripheral initialization programs 22. Each peripheral initialization program 22 is used to initialize corresponding processing program 301 during execution.

Further, during compilation processing, the compiler is configured to connect each peripheral initialization program 22 to the processing program 301 of corresponding physical peripheral module 32.

The disclosure may be used to set the using manner of the physical peripheral module 32 with respect to the product requirement through the arrangement of the peripheral initialization program 22.

In some embodiments, the developer may connect the peripheral initialization program 22 corresponding to the processing program 301 in the configuration header file 20, and thus the peripheral initialization program 22 is being added to the application layer 100 during compilation.

In some embodiments, the development system further includes the development software used for executing compilation. The development software is corresponding to the presently adopted physical chip 31, for example, the development tool provided by the provider of the physical chip 31.

In some embodiments, the development system is connected to the physical chip 31, programs the chip control program 11 to the physical chip 31, and activate the chip control program 11 in the physical chip 31 to make the physical chip 31 control the physical product related circuit 33 through controlling the physical peripheral module 32.

Please refer to FIG. 6, in the example of FIG. 6, the product program 21 may provide multiple control functions (for example, sub-control program), such as power monitoring 41, fan speed control 42, LED control 43, external over-current protection 44 and digital closed-loop control 45.

During execution, the configuration header file 20 may provide parameter to the product program 21 and peripheral initialization program 22.

Multiple peripheral initialization programs 22 may be respectively used for initializing multiple processing program 301.

The control functions of the product program 21 are configured to control multiple physical peripheral modules 32 correspondingly through multiple processing programs 301, and control multiple physical product related circuits 330 to 333 through controlling multiple physical peripheral modules 32 respectively.

For example, the digital closed-loop control 45 is configured to control corresponding physical peripheral module 32 (for example, PWM module) through corresponding processing program 301 to output PWM control signals pwm1, pwm2 to the physical product related circuit 330 (for example, voltage/current control circuit), and to make the physical product related circuit 330 output the voltage signal v1 and current signal i1 to the physical product related circuit 331.

Afterward, the physical product related circuit 331 adjusts the values of the voltage signal v1 and current signal i1 to generate the voltage signal v2 and current signal i2, and transmits the voltage signal v2 and current signal i2 to the other physical peripheral module 32 (for example, analog/digital transformation module) to make the digital closed-loop control 45 determine next PWM control signals pwm1, pwm2 according to the digital value of the voltage signal v2 and current signal i2.

As a result, the external over-current protection 44 may monitor the digital value of the current signal i2 to determine whether triggering over-current protection.

In some other embodiments, the fan speed control 42 is configured to control corresponding physical peripheral module 32 (for example, PWM module) through corresponding processing program 301 to output PWM control signal pwm3 to the physical product related circuit 332 (for example, fan control circuit), and to make the physical product related circuit 332 adjust fan speed based on the PWM control signal pwm3, and to transmit the adjusted result (speed signal tacho1) to the other physical peripheral module 32 (for example, speed signal receiving module) to make the fan speed control 42 obtain the adjusted result through another processing program 301 correspondingly for speed feedback control.

In some other embodiments, the LED control 43 is configured to control corresponding physical peripheral module 32 (for example, LED control module and analog/digital transformation module) through corresponding processing program 301 to output digital LED control signal led1 to the physical product related circuit 333 (for example, LED circuit), and to make the physical product related circuit 333 adjust brightness of LED based on the digital LED control signal led1.

Please refer to FIG. 7, the method of the offline software-in-the-loop simulation of the disclosure may be used to execute the step S30 to the step S33 on the product mode.

In the step S30, the development system is configured to obtain the configuration header file 20. The configuration header file 20 is already set by the developer.

Specifically, the developer may execute the step S40 to the step S41 to set the configuration header file 20.

In the step S40, the developer selects required physical peripheral module 32 of the physical chip 31 and product program 21 to be used in the configuration header file 20.

In the step S41, the developer set the operating mode to be the product mode in the configuration header file 20.

In the step S31, the developer executes the compiler in the development software corresponding to the physical chip 31 to compile the code 2 of the CFA 10 to obtain the chip control program 11. The compiler may be, for example, executing content of the step S20 to the step S22, here is omitted for brevity.

In some embodiments, after the chip control program 11 is obtained, the development system is configured to program the chip control program 11 to the physical chip 31 through the development software and communication interface.

In the step S32, the development system is configured to activate the chip control program 11 programmed to the physical chip 31.

In the step S33, the physical chip 31 is configured to control the physical peripheral module 32 to control the physical product related circuit 33 through executing the chip control program 11.

As a result, the disclosure is used to make the product program 22 be able to control the physical peripheral module 32 of the physical chip 31, and further control the physical product related circuit 33.

Figure 8:
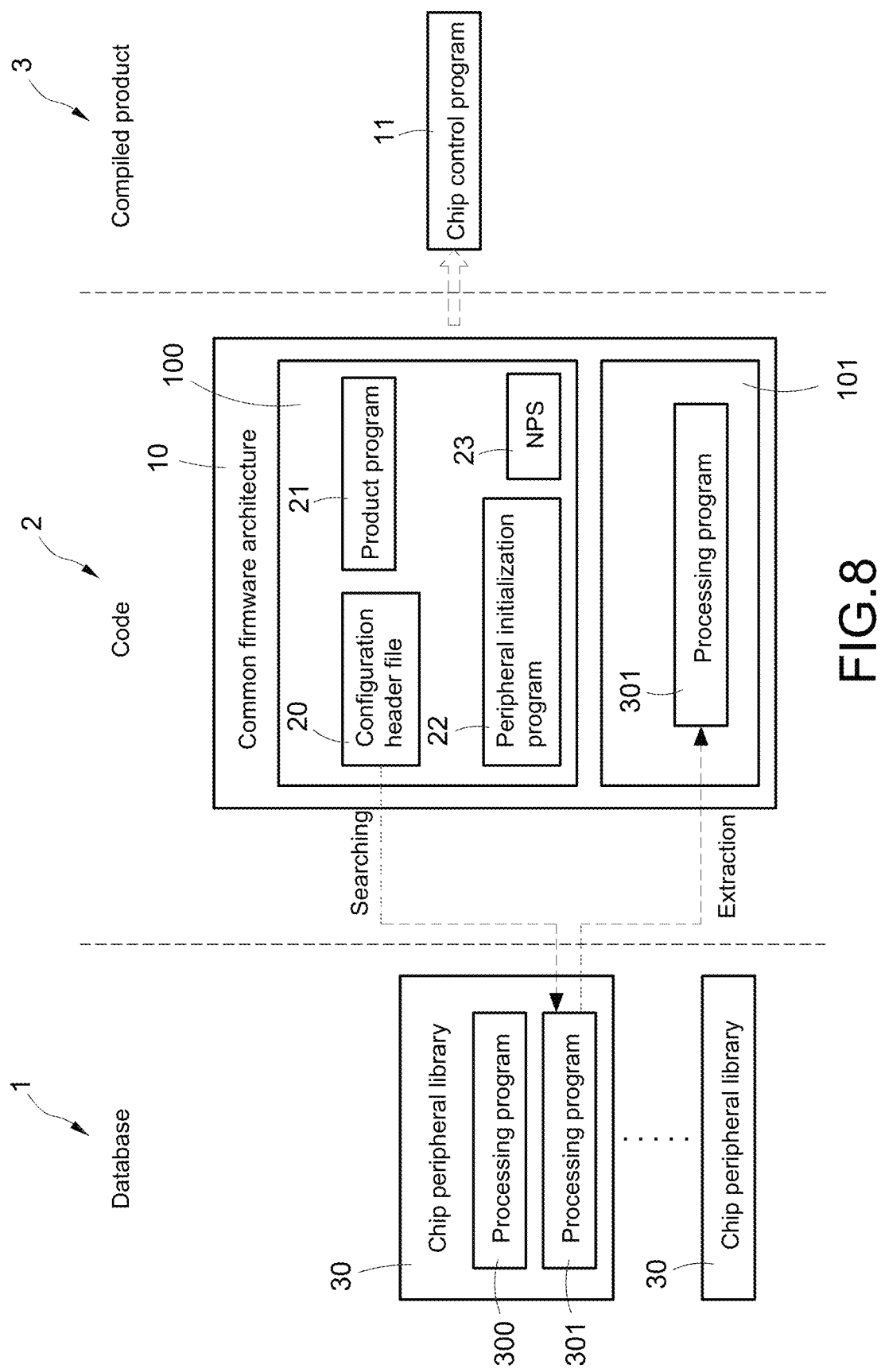
FIG. 8 is a compiling architecture diagram of the virtual mode of the disclosure in accordance with some embodiments.
Figure 9:
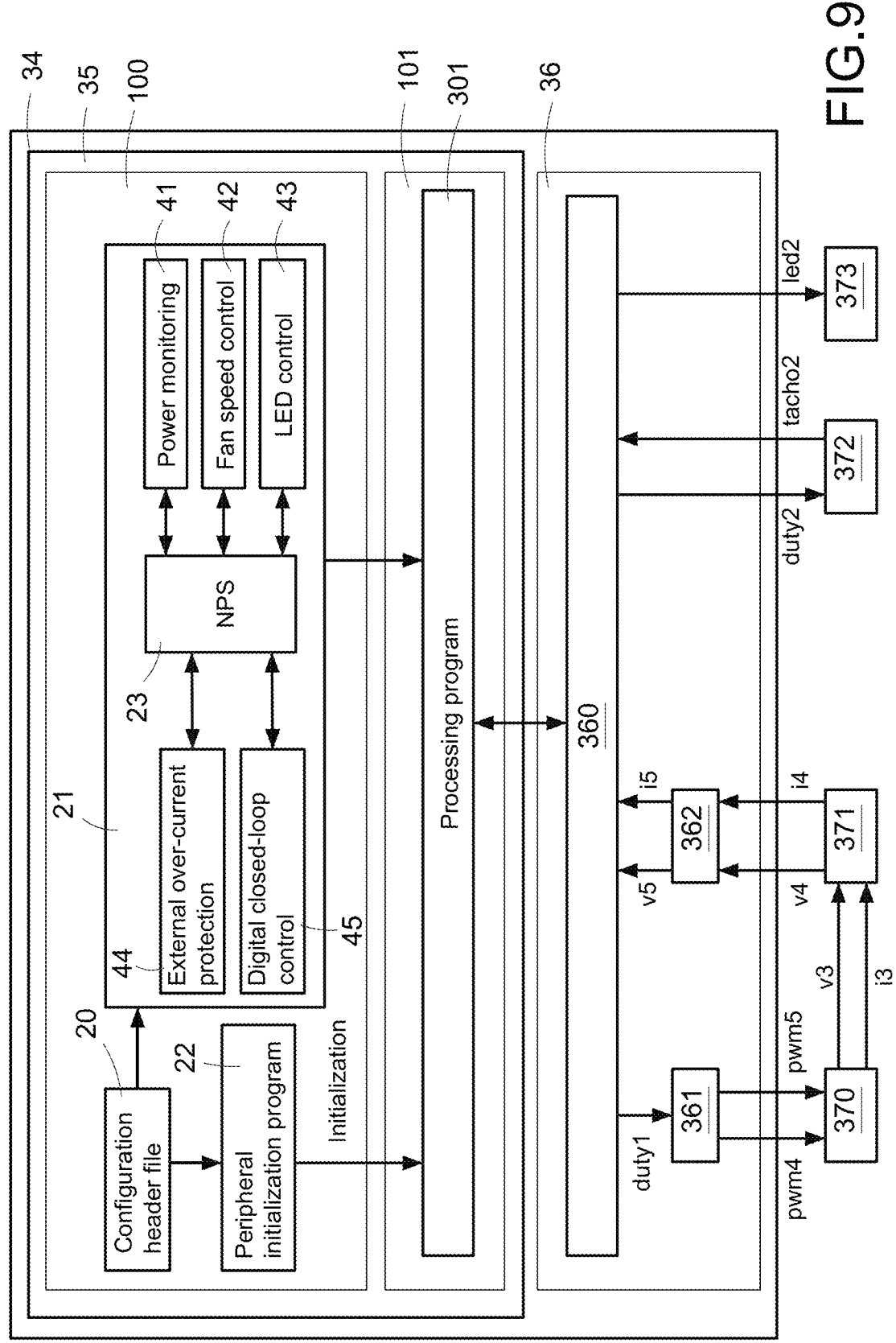
FIG. 9 is an executing architecture diagram of the virtual mode of the disclosure in accordance with some embodiments.
Figure 10:
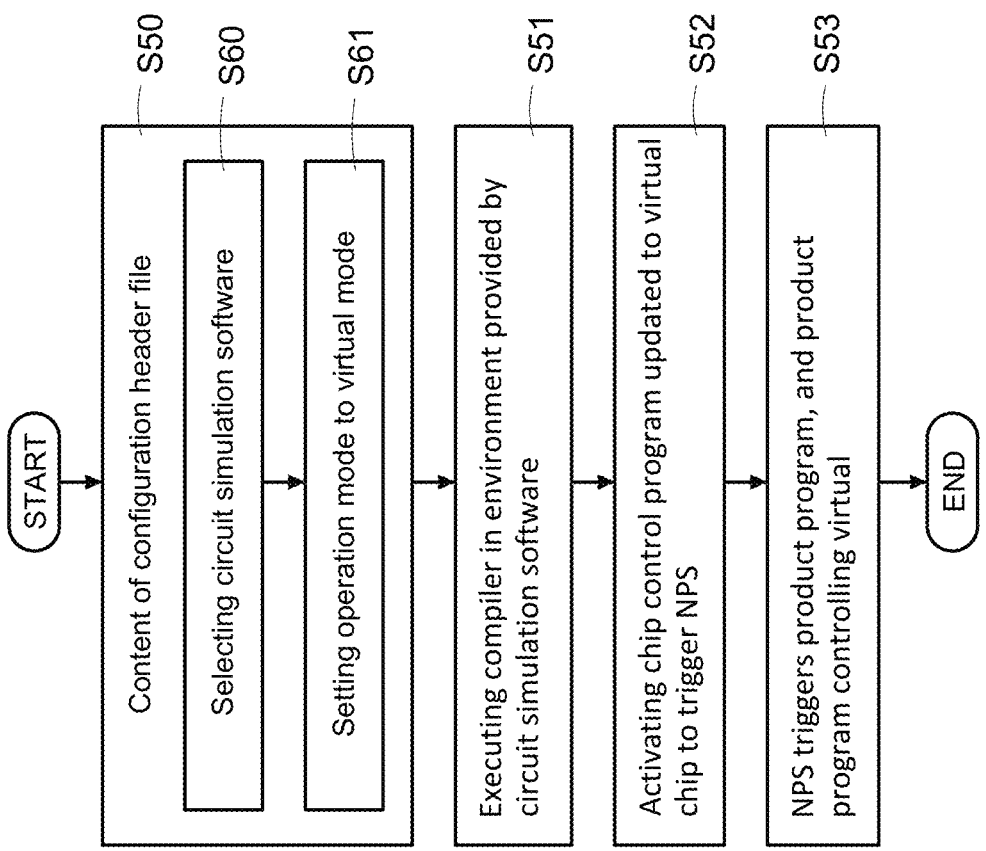
FIG. 10 is a flowchart of the virtual mode of the disclosure in accordance with some embodiments.

Please refer to FIG. 8, FIG. 9 and FIG. 10, which describe the virtual mode of the disclosure. FIG. 8 is a compiling architecture diagram of the virtual mode of the disclosure in accordance with some embodiments. FIG. 9 is an executing architecture diagram of the virtual mode of the disclosure in accordance with some embodiments. FIG. 10 is a flowchart of the virtual mode of the disclosure in accordance with some embodiments.

For the development system to execute the virtual mode, the developer may set the operating mode in the configuration header file 20 to be the virtual mode, select the circuit simulation software, select the virtual chip 34 to be simulated, and select the virtual peripheral module 36 required by the product program 21.

In some embodiments, the development system may include the circuit simulation software. The circuit simulation software is used to simulate the virtual chip 34, one or multiple virtual peripheral modules 36 of the virtual chip 34, and the virtual product related circuit 37.

In some embodiments, the application layer 100 of the CFA 10 may include a non-preemptive scheduler (NPS) 23. The NPS 23 is added to the application layer 100 during compilation.

In some embodiments, the circuit simulation software is configured to activate the chip control program 11 to trigger the NPS 23 during execution to simulate the interrupt/non-interrupt activity of the hardware in a software manner.

The virtual mode of the disclosure is mainly used for testing and verifying the control function of the product program 21 through software, thereby verifying whether the product program 21 has design defect.

It is worth noting that, under the virtual mode, since no physical chip 31 is connected, no interrupt event caused by the hardware may occur, and that leads to unrealistic simulation.

For solving the hardware interrupt processing problem under the virtual mode, the CFA 10 of the embodiment further includes the NPS 23. The NPS is used to simulate program interruption.

In some embodiments, the NPS 23 is a software scheduling manager, and only activated when executing the virtual mode. The NPS 23 is configured to periodically call the software library (interrupt service program and non-interrupt service program) written in the controller chip through the DLL 35, thereby solving the problem of the circuit simulation software being not able to simulate the interrupt processing activity of the physical chip. The DLL 35 is obtained by compiling the code 2 of the CFA 10, and includes the chip control program 11.

In some embodiments, the circuit simulation software is configured to set the parameter of the NPS 23 during execution, and execute the interrupt/non-interrupt program processing through the NPS 23.

In some embodiments, the circuit simulation software may include the periodic interrupt service program, the non-periodic interrupt service program, and the non-interrupt service program. The NPS 23 is used to execute the periodic interrupt service program, the non-periodic interrupt service program and the non-interrupt service program, and simulate the periodic interruption, non-periodic interruption and non-interruption.

In some embodiments, the circuit simulation software is configured to control the virtual peripheral module 36 through the NPS 23, every time the set datum frequency occurs, to control the virtual product related circuit 37.

Please refer to FIG. 9, in the example of FIG. 9, the product program 21 may provide multiple control functions (for example, sub-control program), such as power monitoring 41, fan speed control 42, LED control 43, external over-current protection 44 and digital closed-loop control 45. The control functions are triggered to execute through the NPS 23.

During execution, the configuration header file 20 may provide parameter to the product program 21 and peripheral initialization program 22.

Multiple peripheral initialization programs 22 may be respectively used for initializing multiple processing program 301.

The control functions of the product program 21 are configured to control multiple virtual peripheral modules 36 correspondingly through multiple processing programs 301, and control multiple virtual product related circuits 37 through controlling multiple virtual peripheral modules 36 respectively.

For example, the digital closed-loop control 45 is configured to control corresponding virtual peripheral module 360 (for example, virtual input/output signal module) through corresponding processing program 301 to output adjustment control signal to the virtual peripheral module 361 (for example, virtual PWM module), and to control the virtual peripheral module 361 to output PWM control signals pwm4, pwm5 to the virtual product related circuit 370 (for example, virtual voltage/current control circuit), and to make the virtual product related circuit 370 output the voltage signal v3 and current signal i3 to the virtual product related circuit 371.

Afterward, the virtual product related circuit 371 adjusts the ratio values of the voltage signal v3 and current signal i3 to generate the voltage signal v4 and current signal i4, and transmits the voltage signal v4 and current signal i4 to the other virtual peripheral module 362 (for example, virtual analog/digital transformation module).

Thereafter, the virtual peripheral module 362 transforms the adjusted result to the digital voltage signal v5 and digital current signal i5 (digital adjusted result), and transmits the digital voltage signal v5 and digital current signal i5 to the virtual peripheral module 360.

The digital closed-loop control 45 is configured to determine new control signal duty1 according to the digital voltage signal v5 and digital current signal i5. The external over-current protection 44 may monitor the digital value obtained by the virtual peripheral module 360 through another processing program 301 correspondingly to determine whether triggering over-current protection.

In some other embodiments, the fan speed control 42 is configured to control corresponding virtual peripheral module 360 through corresponding processing program 301 to output the adjustment control signal duty2 to the virtual product related circuit 372 (for example, virtual fan control circuit), and to make the virtual product related circuit 372 to simulate adjusting fan speed based on the adjustment control signal duty2, and to transmit the adjusted result (speed signal tacho2) to the other virtual peripheral module 360 to make the fan speed control 42 obtain the adjusted result through corresponding processing program 301 correspondingly for speed feedback control.

In some other embodiments, the LED control 43 is configured to control corresponding virtual peripheral module 360 through corresponding processing program 301 to output digital LED control signal led2 to the virtual product related circuit 373 (for example, virtual LED circuit), and to make the virtual product related circuit 373 to simulate adjusting brightness of LED based on the digital LED control signal led2.

Please refer to FIG. 10, the method of the offline software-in-the-loop simulation of the disclosure may be used to execute the step S50 to the step S53 on the virtual mode.

In the step S50, the development system is configured to obtain the configuration header file 20. The configuration header file 20 is already set by the developer.

Specifically, the developer may execute the step S60 to the step S61 to set the configuration header file 20.

In the step S60, the developer selects the circuit simulation software to be used in the configuration header file 20.

In some embodiments, the developer may further select the virtual chip 34 and required virtual peripheral module 36 in the circuit simulation software.

In the step S61, the developer set the operating mode to be the virtual mode in the configuration header file 20.

In the step S51, the developer uses the compiler to compile the environment provided by the circuit simulation software to obtain the chip control program 11. The compiler may be, for example, executing content of the step S20 to the step S22, here is omitted for brevity.

In some embodiments, the NPS 23 is added to the application layer 100 during compilation.

Afterward, the development system may update the DLL 35 having the chip control program 11 to the virtual chip 34 provided by the circuit simulation software.

In the step S52, the development system is configured to activate the chip control program 11 in the DLL 35 updated to the virtual chip 34 provided by the circuit simulation software to trigger the NPS 23.

In the step S53, in the circuit simulation software, the NPS 23 is configured to trigger the product program 21. The product program 21 is configured to control the virtual peripheral module 36 to control the virtual product related circuit 37 through the chip control program 11

As a result, the disclosure may realize the software-in-the-loop simulation of the product program 21 in the circuit simulation software.

Figure 11:
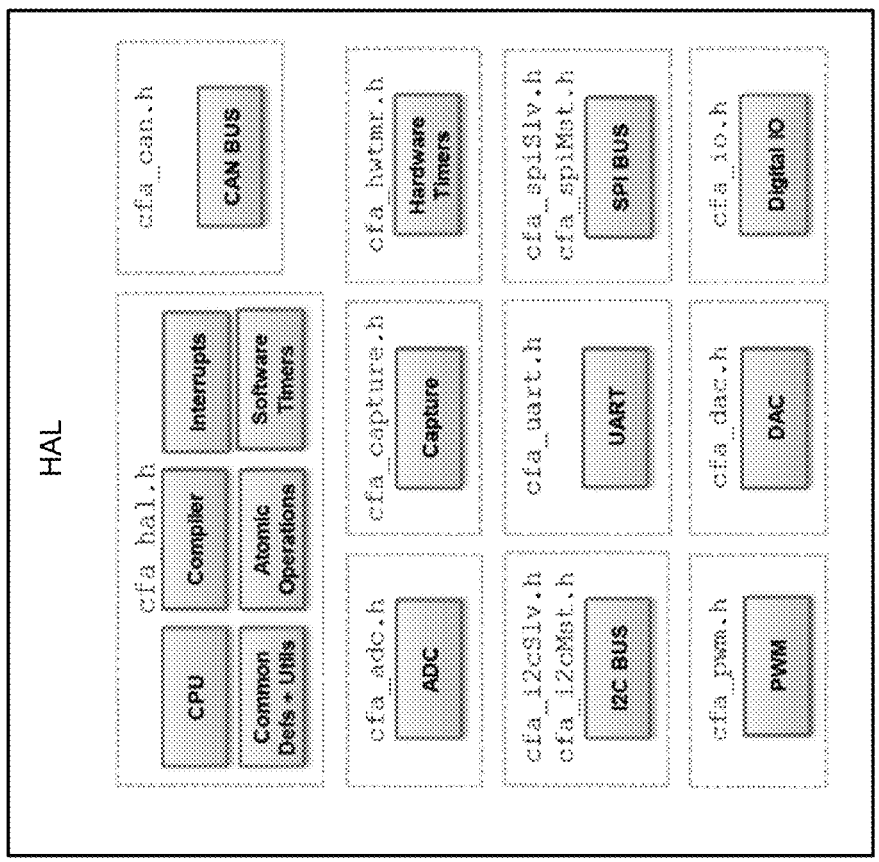
FIG. 11 is an architecture diagram of the HAL of the disclosure in accordance with some embodiments.
Figure 12:
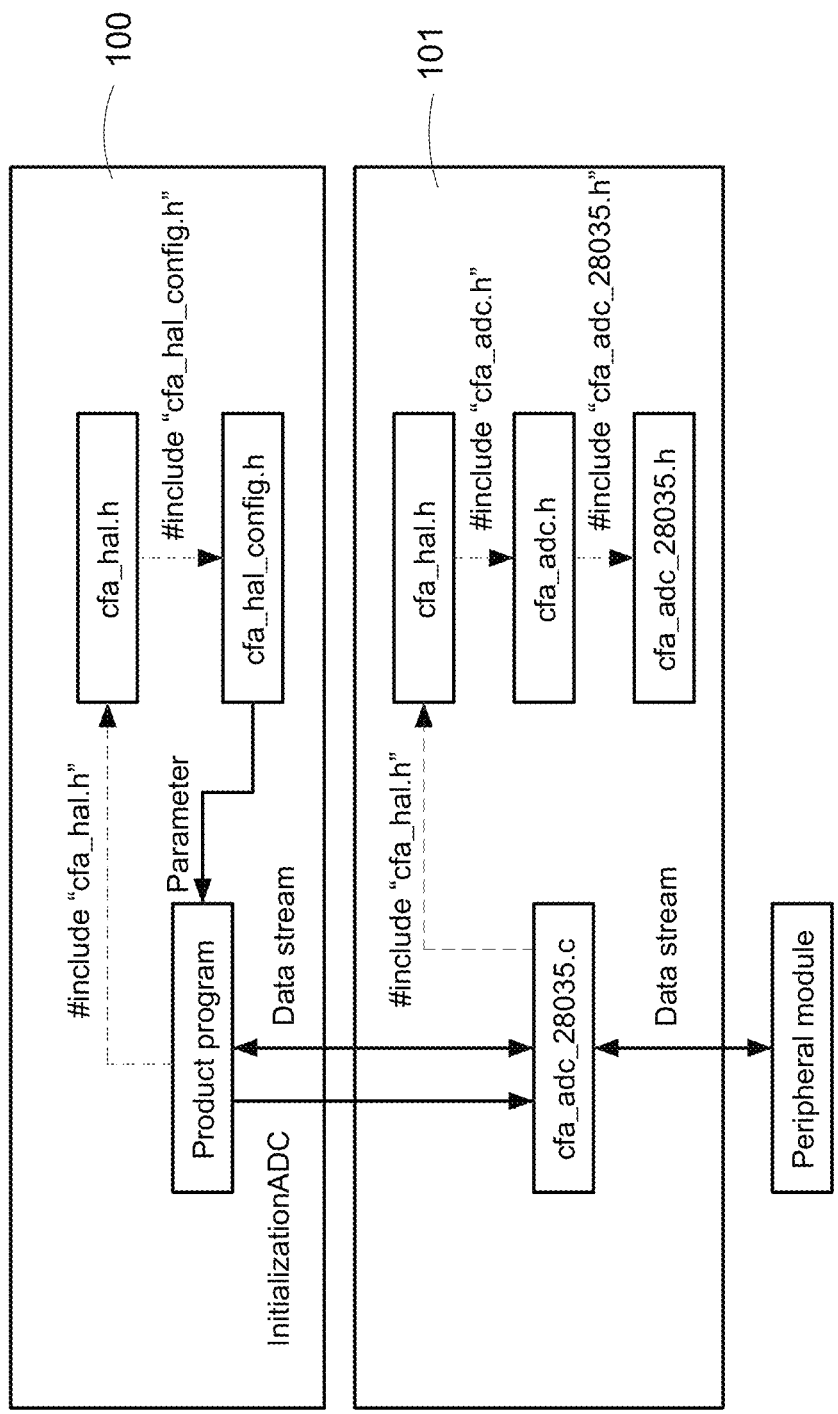
FIG. 12 is a schematic diagram of the data connection of the common firmware architecture of the disclosure in accordance with some embodiments.
Figures 14, 15:
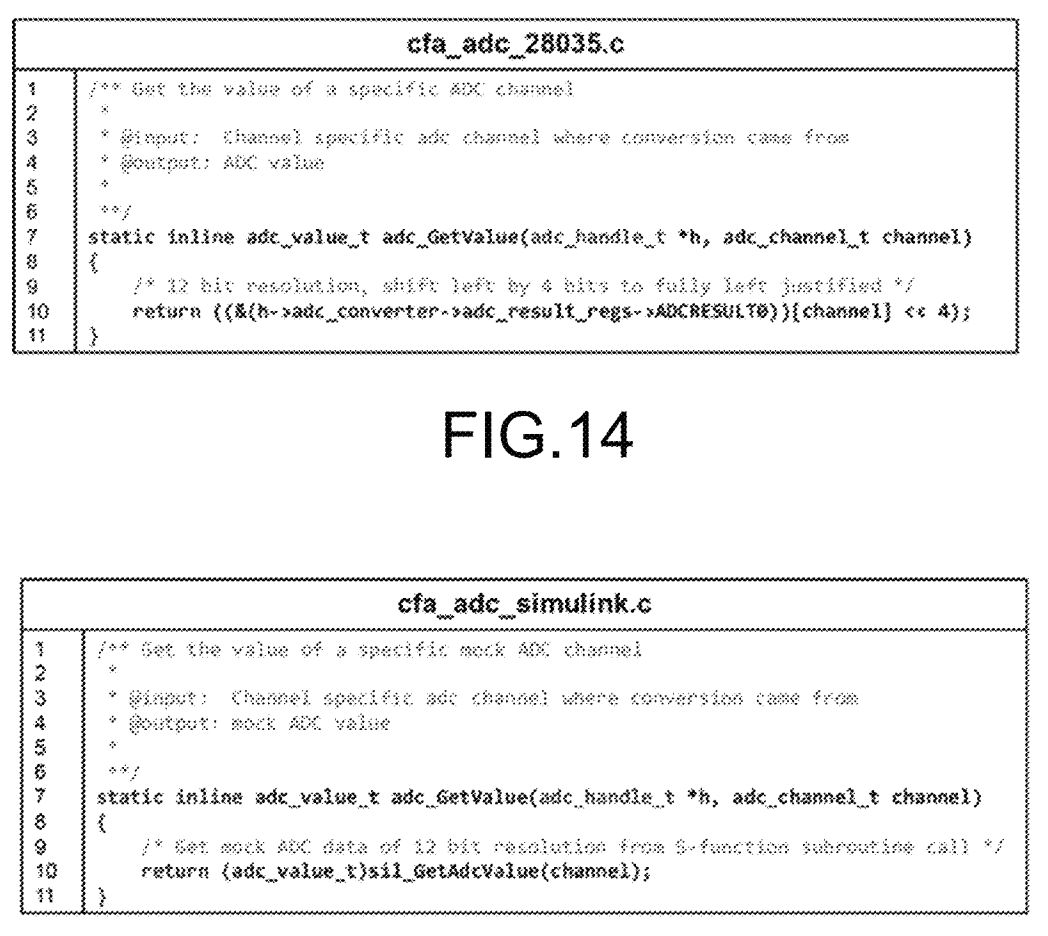

Please refer to FIG. 11 to FIG. 15, FIG. 11 is an architecture diagram of the HAL of the disclosure in accordance with some embodiments, FIG. 12 is a schematic diagram of the data connection of the common firmware architecture of the disclosure in accordance with some embodiments, FIG. 13 is a partially schematic diagram of the configuration header file of the disclosure in accordance with some embodiments, FIG. 14 is a schematic diagram of the processing program of the controller chip of the disclosure in accordance with some embodiments, and FIG. 15 is a partially schematic diagram of the processing program of the circuit simulation software of the disclosure in accordance with some embodiments.

In some embodiments, as shown in FIG. 11, the HAL 101 may include multiple header files. Each header file is used to set and connect the processing program of corresponding peripheral module.

In some embodiments, as shown in FIG. 12, in the application layer 100, the product program may be configured to include the HAL header file "cfa_hal.h" through the command "#include "cfa_hal.h"".

In the "cfa_hal.h" of the application layer, the product program may be configured to include the configuration header file "cfa_hal_config.h" through the command "#include "cfa_hal_config.h". The configuration header file "cfa_hal_config.h" is configured to provide execution parameter to the product program.

Further, taking the setting of analog/digital converter (ADC) as an example, the product program may establish a data stream with the ADC processing program "cfa_adc_28035.c" of the HAL, and establish a data stream with the peripheral module (such as ADC module) through the ADC processing program "cfa_adc_28035.c".

Additionally, the ADC processing program "cfa_adc_28035.c" may be configured to include the HAL header file "cfa_hal.h" through the command "#include "cfa_hal.h"".

In the HAL header file "cfa_hal.h" of the HAL, the ADC processing program "cfa_adc_28035.c" may be configured to include the ADC header file "cfa_adc.h" through the command "#include "cfa_adc.h"".

In the ADC header file "cfa_adc.h" of the HAL, the ADC processing program "cfa_adc_28035.c" may be configured to include the controller chip header file "cfa_adc_28035.h" through the command "#include "cfa_adc_28035.h"".

As a result, the product program may control the peripheral module (ADC module) through the controller chip (such as control chip "TI TMS320F28035").

In some embodiments, as shown in FIG. 13, the developer may set the parameter in the configuration header file "cfa_hal_config.h".

The parameter content includes: present operating mode, product mode or virtual mode; the manufacturer, model and used compiler of the physical chip under the product mode; the circuit simulation software and used compiler under the virtual mode, here is not intended to be limiting.

For example, the parameter may be set to be: the product mode; the physical chip is the control chip "TI TMS320F28035"; the compiler is C2000.

For another example, the parameter may be set to be: the virtual mode; the circuit simulation software is S-function of SIMULINK; the compiler is MinGW-w64.

For example, as shown in FIG. 14, under the product mode, the configuration header file is configured to connect the processing program "cfa_adc_28035.c" to make the chip control program be compatible with the present physical chip.

For another example, as shown in FIG. 15, under the virtual mode, the configuration header file is configured to connect the processing program "cfa_adc_simulink.c" to make the chip control program be compatible with the present circuit simulation software.

Please refer to FIG. 2 to FIG. 16, FIG. 16 is a flowchart of the NPS of the disclosure in accordance with some embodiments.

When the method of the offline software-in-the-loop simulation of the disclosure is used to execute the chip control program, the step S70 to the step S72 may be executed at the same time to provide interrupt/non-interrupt program processing function.

In the step S70, the development system is configured to set the parameter of the NPS 23.

In some embodiments, when multiple periodic interrupt service programs are existed and the periodic interrupt service programs respectively have different periodic interrupt frequencies, the development system is configured to determine the datum frequency based on the periodic interrupt frequencies, for example, the minimum, maximum, or average value.

In some embodiments, the development system is configured to select the highest frequency in the periodic interrupt frequencies as the datum frequency.

For example, if the periodic interrupt frequencies are 5 KHz, 200 KHz and 1 KHz, the NPS 23 is configured to select 200 KHz as the triggering frequency.

Thereafter, the development system is configured to set the non-interrupt triggering cycle to the non-interrupt counter used in the non-interrupt service program based on the datum frequency.

Additionally, the development system is configured to set the non-periodic interrupt triggering cycle to the non-periodic interrupt counter used in the non-periodic interrupt service program based on the datum frequency.

For example, if the datum frequency is 100 KHz, the non-interrupt frequency is desirably set to be 50 KHz and the non-periodic interrupt frequency is desirably set to be 10 KHz, and the non-interrupt triggering cycle may be set to be two (that is, the datum frequency occurs every two times, executing non-interruption one time) and the non-periodic interrupt triggering cycle may be set to be ten (that is, the datum frequency occurs every ten times, executing non-periodic interruption one time).

In the step S71, the development system is configured to execute the interrupt/non-interrupt program processing through the NPS 23.

In some embodiments, the interrupt/non-interrupt program processing includes executing the periodic interrupt service program, the non-periodic interrupt service program and the non-interrupt service program.

Specifically, the program execution has three kinds of interrupt mechanisms, such as the non-interrupt service program (for example, polling), the periodic interrupt service program (interrupt service routine, ISR) and the non-periodic interrupt service program (non-periodic ISR).

In the product mode, the physical chip 31 may execute the interrupt processing.

In the virtual mode, the disclosure is simulating the interrupt processing through the NPS 23.

The step S71 may include the step S80 to the step S82 to process the aforementioned three kinds of interrupt mechanisms.

In the step S80, the development system is configured to execute the non-interrupt service program to process the non-interrupt event.

In the step S81, the development system is configured to execute the periodic interrupt service program to process the periodic interrupt event.

In the step S82, the development system is configured to execute the non-periodic interrupt service program to process the non-periodic interrupt event.

In the step S72, the development system is configured to determine whether terminating the interrupt/non-interrupt program processing.

If the execution is terminated, the method is being terminated.

If the execution does not need to be terminated, the step S71 is re-executed to repeatedly execute the interrupt/non-interrupt program processing based on the datum frequency.

As a result, the disclosure may be used to detect the non-interrupt event and non-periodic interrupt event through the polling manner, and effectively simulate the hardware interruption under software environment.

Please refer to FIG. 2 to FIG. 17, FIG. 17 is a flowchart of the interrupt/non-interrupt program processing of the disclosure in accordance with some embodiments.

Figure 16:
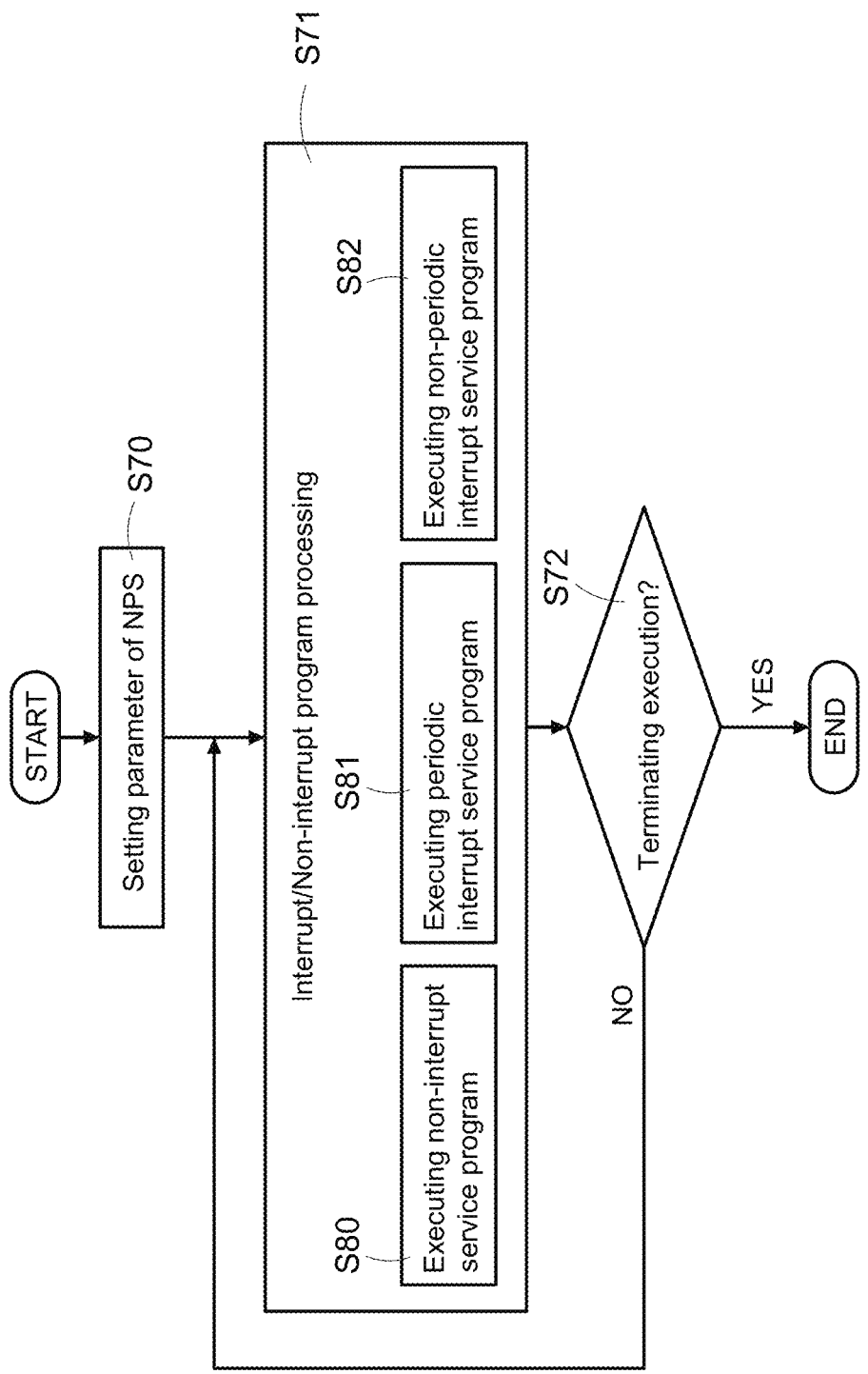
FIG. 16 is a flowchart of the NPS of the disclosure in accordance with some embodiments.
Figure 17:
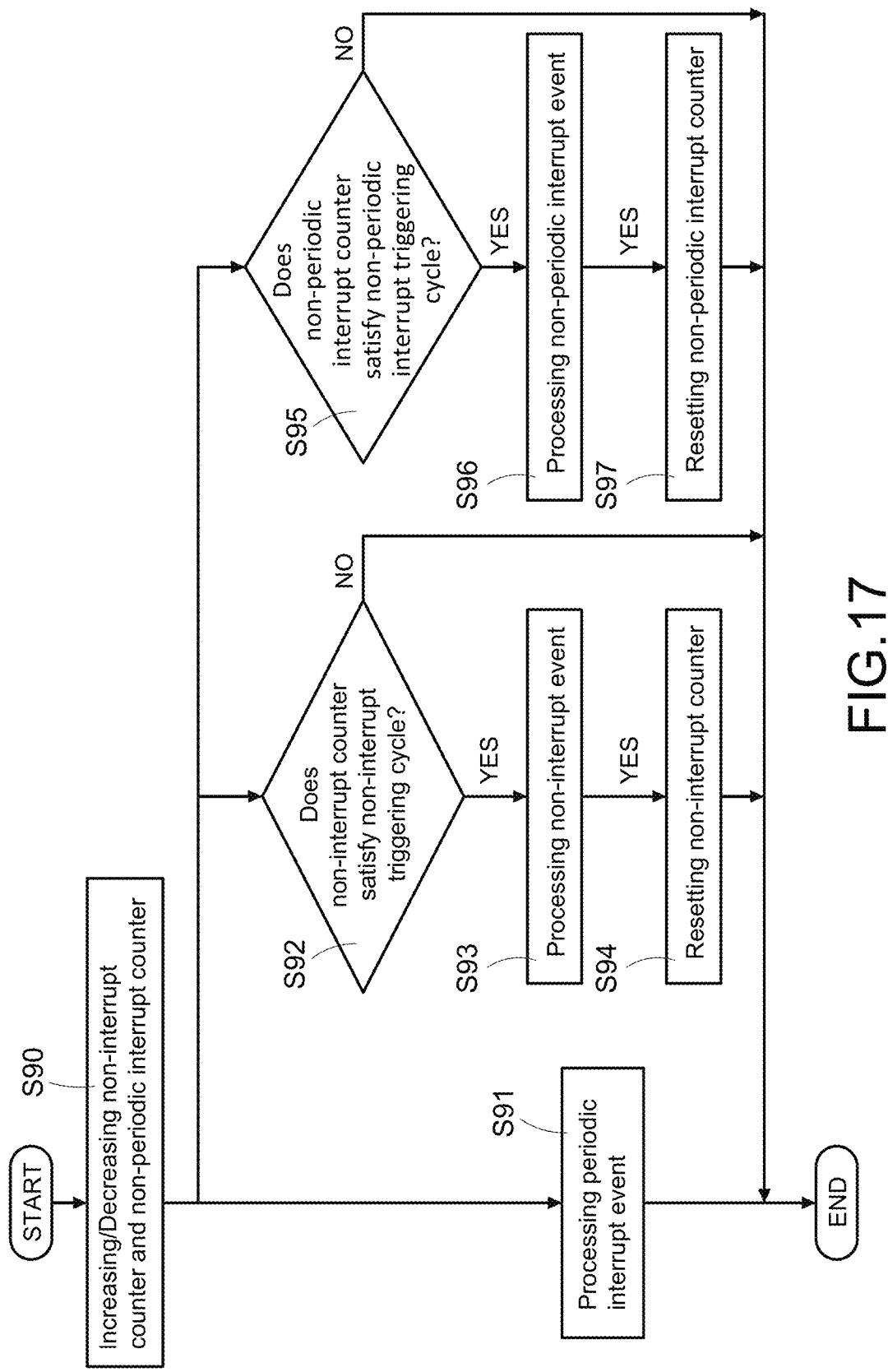
FIG. 17 is a flowchart of the interrupt/non-interrupt program processing of the disclosure in accordance with some embodiments.

In the embodiment, the NPS 23 is configured to repeatedly execute the step S71 (that is, interrupt/non-interrupt program processing) shown in FIG. 16 by the datum frequency. Comparing to the embodiment in FIG. 16, the interrupt/non-interrupt program processing of the embodiment may include the step S90 to the step S97.

In the step S90, the NPS 23 is configured to control the non-interrupt counter and non-periodic interrupt counter to count, such as increasing by one or decreasing by one.

In the step S91, the NPS 23 is configured to process the periodic interrupt event consistent with the datum frequency.

After the step S91, the NPS 23 may re-execute the interrupt/non-interrupt program processing.

In the step S92, the NPS 23 is configured to determine whether the value of the non-interrupt counter satisfy the non-interrupt triggering cycle.

If the non-interrupt triggering cycle is satisfied, the NPS 23 executes the step S93. If the non-interrupt triggering cycle is not satisfied, the processing is terminated.

In the step S93, the NPS 23 is configured to process the non-interrupt event.

In the step S94, the NPS 23 is configured to reset the non-interrupt counter to re-count the waiting time for processing the non-interrupt event for the next time.

After the step S94, the NPS 23 may re-execute the interrupt/non-interrupt program processing.

In the step S95, the NPS 23 is configured to determine whether the value of the non-periodic interrupt counter satisfy the set non-periodic interrupt triggering cycle.

If the non-periodic interrupt triggering cycle is satisfied, the NPS 23 executes the step S96. If the non-periodic interrupt triggering cycle is not satisfied, the processing is terminated.

In the step S96, the NPS 23 is configured to process the non-periodic interrupt event.

In the step S97, the NPS 23 is configured to reset the non-periodic interrupt counter to re-count the waiting time for processing the non-periodic interrupt event for the next time.

After the step S97, the NPS 23 may re-execute the interrupt/non-interrupt program processing.

As a result, the disclosure may be used to simulate the hardware interruption to obtain desirable simulation result.

While this disclosure has been described by means of specific embodiments, numerous modifications and variations may be made thereto by those skilled in the art without departing from the scope and spirit of this disclosure set forth in the claims.

What is claimed is:

1. A development system of an offline software-in-the-loop simulation, the development system comprising:
   a database, comprising at least one chip peripheral library, the chip peripheral library comprising at least one processing program; and
   a common firmware architecture, configured to generate a chip control program after being compiled, the common firmware architecture comprising:
     an application layer, comprising a product program and a configuration header file, wherein the product program is configured to record a code of controlling a product related circuit, and the configuration header file is configured to connect the processing program required by a peripheral module; and
     a hardware abstraction layer (HAL), comprising the processing program, wherein the application layer is configured to add the processing program from the database to the HAL correspondingly during compilation based on the peripheral module being controlled specifically by a physical chip or a circuit simulation software;
   wherein the chip control program is configured to be executed in the physical chip or the circuit simulation software, and control the product related circuit through controlling the peripheral module.

2. The development system according to claim 1, further comprising:
   a development software, configured to execute compilation, and corresponding to the physical chip;
   wherein, in the configuration header file, the operating mode is configured to be a product mode, and the physical chip and a physical peripheral module being required are selected, and
   the development system is configured to connect the physical chip, and make, by activating the chip control program programmed in the physical chip, the physical chip control a physical product related circuit through controlling the physical peripheral module.

3. The development system according to claim 1, further comprising:
   the circuit simulation software, configured to simulate a virtual chip, a virtual peripheral module of the virtual chip, and a virtual product related circuit;
   wherein, in the configuration header file, the operating mode is configured to be a virtual mode, and the circuit simulation software is selected,
   the application layer further comprises a non-preemptive scheduler (NPS), the NPS is added to the application layer during compilation,
   the circuit simulation software is configured to activate the chip control program during execution to trigger the NPS,
   the NPS is configured to trigger the product program during execution, and control the virtual peripheral module through the chip control program to control the virtual product related circuit.

4. The development system according to claim 3, wherein the circuit simulation software is configured to set a parameter of the NPS during execution, and execute an interrupt/non-interrupt program processing through the NPS.

5. The development system according to claim 4, wherein the circuit simulation software further comprises a periodic interrupt service program, a non-periodic interrupt service program and a non-interrupt service program, and
   the NPS is configured to execute the periodic interrupt service program, the non-periodic interrupt service program and the non-interrupt service program.

6. The development system according to claim 4, wherein the NPS is configured to determine a datum frequency during execution based on multiple periodic interrupt frequencies, set a non-interrupt triggering cycle to a non-interrupt counter based on the datum frequency, and set a non-periodic interrupt triggering cycle to a non-periodic interrupt counter based on the datum frequency.

7. The development system according to claim 4, wherein the NPS is configured to select a highest frequency in the periodic interrupt frequencies to be a datum frequency, and repeatedly execute the interrupt/non-interrupt program processing by the datum frequency.

8. The development system according to claim 7, wherein the NPS comprises a non-interrupt counter and a non-periodic interrupt counter, and
   the NPS is configured to control the non-interrupt counter and the non-periodic interrupt counter to count every time the interrupt/non-interrupt program processing is executed, process a periodic interrupt event, process a non-interrupt event when a value of the non-interrupt counter satisfy a non-interrupt triggering cycle and reset the non-interrupt counter, and process a non-periodic interrupt event when a value of the non-periodic interrupt counter satisfy a non-periodic interrupt triggering cycle and reset the non-periodic interrupt counter.

9. The development system according to claim 1, wherein the application layer further comprises a peripheral initialization program, added to the application layer during compilation and configured to initialize the processing program during execution, and the configuration header file is configured to connect the peripheral initialization program corresponding to the processing program.

10. The development system according to claim 1, further comprising:
a storage, configured to store the database and the common firmware architecture; and
a processor, electrically connected with the storage and configured to execute program.

11. A method of an offline software-in-the-loop simulation, the method comprising:
a) obtaining a product program and a configuration header file, wherein the product program is configured to record a code of controlling a product related circuit, the configuration header file is configured to connect a processing program required by a peripheral module, and the processing program is configured to control the peripheral module in a physical chip or a circuit simulation software;
b) executing a compiler to compile the product program and the configuration header file to generate a chip control program; and
c) executing the chip control program in the physical chip or the circuit simulation software to control the product related circuit through controlling the peripheral module;
wherein the b) comprises:
b1) searching the processing program from a database based on the configuration header file, and adding the processing program to a hardware abstraction layer (HAL);
b2) compiling an application layer and the HAL to generate the chip control program, wherein the application layer comprises the product program and the configuration header file; and
b3) providing the chip control program to the physical chip or the circuit simulation software.

12. The method according to claim 11, wherein, in the configuration header file, the operating mode is configured to be a product mode, and the physical chip and a physical peripheral module being required are selected;
the b) further comprises:
executing the compiler in a development software corresponding to the physical chip;
the c) comprises:
c1) activating the chip control program programmed in the physical chip; and
c2) executing the chip control program, by the physical chip, to control the physical peripheral module to control a physical product related circuit.

13. The method according to claim 11, wherein, in the configuration header file, the operating mode is configured to be a virtual mode, and the circuit simulation software is selected;

the b) further comprises:
executing the compiler in an environment provided by the circuit simulation software;
the c) comprises:
c3) activating the chip control program updated to a virtual chip provided by the circuit simulation software to trigger a non-preemptive scheduler (NPS); and
c4) in the circuit simulation software, triggering the product program, by the NPS, to control a virtual peripheral module to control a virtual product related circuit through the chip control program.

14. The method according to claim 13, wherein the c4) comprises:
c41) setting a parameter of the NPS; and
c42) executing an interrupt/non-interrupt program processing through the NPS.

15. The method according to claim 14, wherein the interrupt/non-interrupt program processing comprises: executing a periodic interrupt service program, a non-periodic interrupt service program and a non-interrupt service program.

16. The method according to claim 14, wherein the c41) comprises:
c411) determining a datum frequency based on multiple periodic interrupt frequencies;
c412) setting a non-interrupt triggering cycle to a non-interrupt counter based on the datum frequency; and
c413) setting a non-periodic interrupt triggering cycle to a non-periodic interrupt counter based on the datum frequency.

17. The method according to claim 16, wherein the c411) comprises: selecting a highest frequency in the periodic interrupt frequencies to be the datum frequency.

18. The method according to claim 14, wherein the c42) comprises: repeatedly executing the interrupt/non-interrupt program processing by a datum frequency.

19. The method according to claim 18, wherein the interrupt/non-interrupt program processing comprises:
d1) controlling a non-interrupt counter and a non-periodic interrupt counter to count;
d2) processing a periodic interrupt event;
d3) when a value of the non-interrupt counter satisfy a non-interrupt triggering cycle, processing a non-interrupt event and resetting the non-interrupt counter; and
d4) when a value of the non-periodic interrupt counter satisfy a non-periodic interrupt triggering cycle, processing a non-periodic interrupt event and resetting the non-periodic interrupt counter.

20. The method according to claim 19, wherein the d1) comprises: increasing or decreasing the value of the non-interrupt counter and the value of the non-periodic interrupt counter.

* * * * *